(12) United States Patent
Yamada et al.

(10) Patent No.: US 10,604,684 B2
(45) Date of Patent: Mar. 31, 2020

(54) ELECTRICALLY PEELABLE ADHESIVE COMPOSITION AND ELECTRICALLY PEELABLE ADHESIVE SHEET, AND METHOD FOR USING ELECTRICALLY PEELABLE ADHESIVE SHEET

(71) Applicant: LINTEC CORPORATION, Itabashi-ku (JP)

(72) Inventors: Haruya Yamada, Warabi (JP); Kiichiro Kato, Saitama (JP); Tomio Hatanaka, Kita-ku (JP); Takashi Sugino, Kawaguchi (JP); Satoshi Kawada, Koshigaya (JP)

(73) Assignee: LINTEC CORPORATION, Itabashi-ku (JP)

( * ) Notice: Subject to any disclaimer, the term of this patent is extended or adjusted under 35 U.S.C. 154(b) by 743 days.

(21) Appl. No.: 14/768,369

(22) PCT Filed: Mar. 26, 2014

(86) PCT No.: PCT/JP2014/058672
§ 371 (c)(1),
(2) Date: Aug. 17, 2015

(87) PCT Pub. No.: WO2014/157408
PCT Pub. Date: Oct. 2, 2014

(65) Prior Publication Data
US 2016/0009961 A1 Jan. 14, 2016

(30) Foreign Application Priority Data
Mar. 27, 2013 (JP) .................................. 2013-067224

(51) Int. Cl.
*C09J 133/08* (2006.01)
*C09J 5/00* (2006.01)
(Continued)

(52) U.S. Cl.
CPC ............... *C09J 133/08* (2013.01); *B32B 7/06* (2013.01); *B32B 7/12* (2013.01); *B32B 27/308* (2013.01);
(Continued)

(58) Field of Classification Search
CPC . C09J 133/08; C09J 133/10; C09J 9/00; C09J 11/06; C09J 2433/00; C09J 11/08;
(Continued)

(56) References Cited

U.S. PATENT DOCUMENTS 5,064,717 A * 11/1991 Suzuki ............... C09D 133/064
427/208
8,420,214 B2 * 4/2013 Kavanagh ................. C08F 8/32
428/355 N
(Continued)

FOREIGN PATENT DOCUMENTS

EP  2 562 226 A1  2/2013
JP  5-39474 A  2/1993
(Continued)

OTHER PUBLICATIONS

Machine Translation of JP 2010-037355 A (Year: 2010).*
(Continued)

*Primary Examiner* — Scott R. Walshon
(74) *Attorney, Agent, or Firm* — Oblon, McClelland, Maier & Neustadt, L.L.P.

(57) ABSTRACT

An electrically peelable pressure sensitive adhesive composition, which contains an acrylic polymer (A), a (poly) alkylene polyol (B) having a number average molecular weight of no greater than 2000, and an ammonium salt (C), has a high adhesiveness before voltage application, but the adhesiveness can decrease effectively by voltage application for a short time.

15 Claims, 3 Drawing Sheets

(51) Int. Cl.
- *C09J 171/02* (2006.01)
- *C08K 5/42* (2006.01)
- *C09J 9/00* (2006.01)
- *B32B 27/30* (2006.01)
- *C08F 220/18* (2006.01)
- *C09J 7/38* (2018.01)
- *C08L 71/03* (2006.01)
- *C08L 33/08* (2006.01)
- *B32B 7/06* (2019.01)
- *B32B 7/12* (2006.01)
- *C09J 11/08* (2006.01)
- *C08K 5/17* (2006.01)

(52) U.S. Cl.
CPC ............ *C08F 220/18* (2013.01); *C08L 33/08* (2013.01); *C08L 71/03* (2013.01); *C09J 5/00* (2013.01); *C09J 7/385* (2018.01); *C09J 9/00* (2013.01); *C09J 11/08* (2013.01); *C09J 171/02* (2013.01); *B32B 2307/202* (2013.01); *B32B 2307/748* (2013.01); *B32B 2405/00* (2013.01); *B32B 2451/00* (2013.01); *C08K 5/17* (2013.01); *C08K 5/42* (2013.01); *C09J 2201/606* (2013.01); *C09J 2205/102* (2013.01); *C09J 2205/302* (2013.01); *C09J 2433/00* (2013.01); *C09J 2471/00* (2013.01)

(58) Field of Classification Search
CPC ... C09J 2471/00; C09J 2201/606; C08K 5/16; C08K 5/17; B32B 2307/202; B32B 2307/748; C08F 220/18
See application file for complete search history.

(56) References Cited

U.S. PATENT DOCUMENTS

| | | | |
|---|---|---|---|
| 9,040,155 B2* | 5/2015 | Ha | C09J 133/04 428/354 |
| 2001/0031367 A1 | 10/2001 | Gilbert | |
| 2006/0057371 A1* | 3/2006 | Kobayashi | C09J 133/04 428/355 R |
| 2006/0088670 A1* | 4/2006 | Kim | C09J 133/08 428/1.31 |
| 2011/0076493 A1* | 3/2011 | Kavanagh | C08F 8/32 428/355 N |
| 2012/0300300 A1 | 11/2012 | Yasui et al. | |
| 2013/0029146 A1 | 1/2013 | Takashima et al. | |
| 2013/0034730 A1 | 2/2013 | Morimoto et al. | |
| 2013/0040137 A1 | 2/2013 | Morimoto et al. | |

FOREIGN PATENT DOCUMENTS

| | | |
|---|---|---|
| JP | 2003-129030 A | 5/2003 |
| JP | 2010-37355 A | 2/2010 |
| JP | 2013-163783 A | 8/2013 |
| WO | 2007/018239 A1 | 2/2007 |

OTHER PUBLICATIONS

U.S. Appl. No. 14/768,300, filed Aug. 17, 2015, Yamada, et al.
U.S. Appl. No. 14/768,399, filed Aug. 17, 2015, Yamada, et al.
Extended European Search Report dated Jul. 18, 2016 in Patent Application No. 14774361.1.
International Search Report dated Jun. 3, 2014 in PCT/JP14/058672 Filed Mar. 26, 2014.

* cited by examiner

FIG.2
(a)
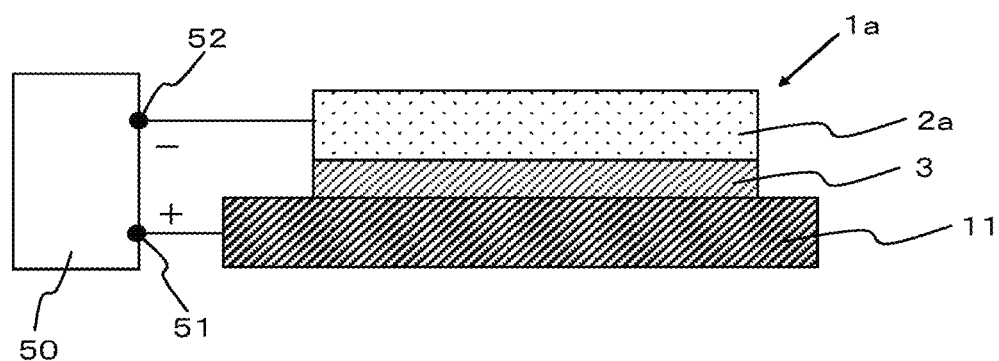
(b)
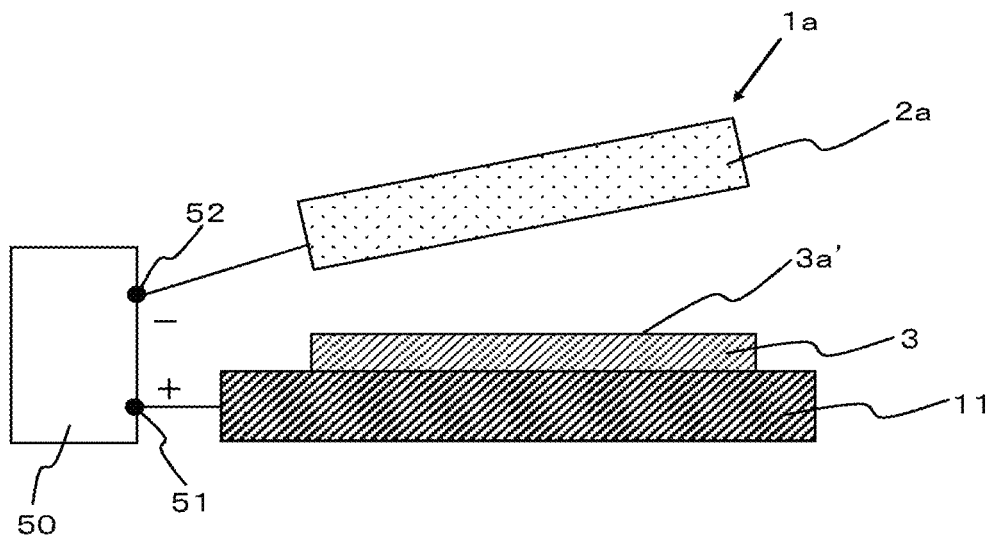

FIG.3
(a)
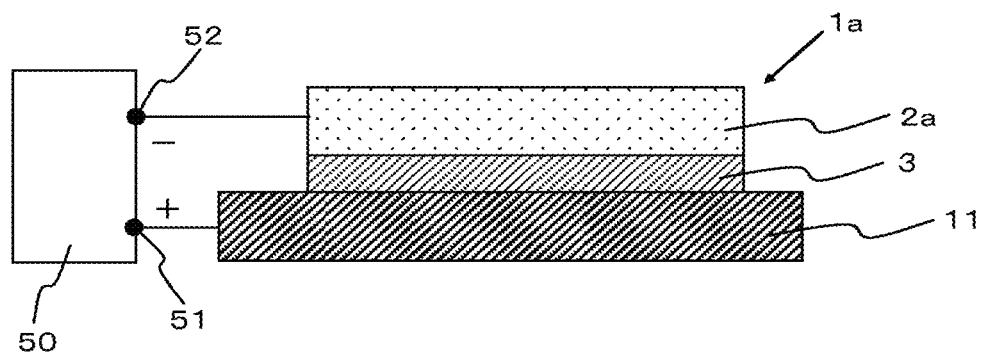
(b)
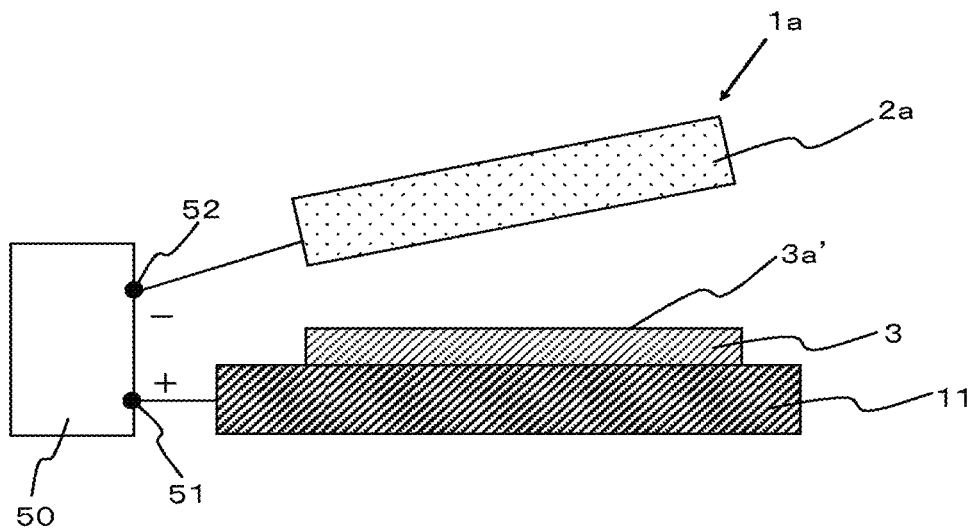

ELECTRICALLY PEELABLE ADHESIVE COMPOSITION AND ELECTRICALLY PEELABLE ADHESIVE SHEET, AND METHOD FOR USING ELECTRICALLY PEELABLE ADHESIVE SHEET

TECHNICAL FIELD

The present invention relates to an electrically peelable pressure sensitive adhesive composition whose adhesiveness can be decreased by applying a voltage, and an electrically peelable pressure sensitive adhesive sheet having a pressure sensitive adhesive layer comprising the pressure sensitive adhesive composition, and a method for using the electrically peelable pressure sensitive adhesive sheet.

BACKGROUND ART

As one of the properties of pressure sensitive adhesive sheets, peelability is required in some cases, for example, in applications such as surface protection films, masking tapes for coating or for decoration, and peelable notes.

When such pressure sensitive adhesive sheets are stuck to adherends, adhesion by which the pressure sensitive adhesive sheets do not peel from the adherends is required during transport, during storage, during processing, and the like. On the other hand, it is required that the pressure sensitive adhesive sheets can be easily peeled and removed after they complete serving their function.

As pressure sensitive adhesives used in such pressure sensitive adhesive sheets, pressure sensitive adhesives whose adhesion decreases by applying a voltage are known.

For example, Patent Literature 1 discloses an electrochemically debondable adhesive comprising a high load-resistant bonding polymer having high mechanical strength and comprising an electrolyte.

In addition, Patent Literature 2 discloses an electropeeling composition comprising an ionic liquid as a pressure sensitive adhesive peelable during voltage application. Patent Literature 2 states that the ionic liquid is a molten salt that is a liquid at room temperature, has no vapor pressure, and has properties such as high heat resistance, nonflammability, and high chemical stability.

CITATION LIST

Patent Literature

[PTL 1]
JP-A 2003-129030
[PTL 2]
WO2007/018239

SUMMARY OF INVENTION

Technical Problem

However, when a pressure sensitive adhesive sheet is provided using the adhesive disclosed in Patent Literature 1, a time of about 10 to 15 minutes is required to peel the pressure sensitive adhesive sheet from an adherend, and therefore, the workability is poor.

In addition, the ionic liquid contained in the composition disclosed in Patent Literature 2 is a compound having a special structure as described in the literature and therefore has a high price, and it is difficult to provide an inexpensive pressure sensitive adhesive tape using them. Further, a pressure sensitive adhesive sheet using the composition disclosed in Patent Literature 2 still has room for improvement in the decrease rate of adhesion between before and after voltage application.

It is an object of the present invention to provide an electrically peelable pressure sensitive adhesive composition whose adhesiveness before voltage application is high, but can be effectively decreased by voltage application for a short time, and an electrically peelable pressure sensitive adhesive sheet having a pressure sensitive adhesive layer comprising the pressure sensitive adhesive composition, and a method for using an electrically peelable pressure sensitive adhesive sheet.

Solution to Problem

It is found out that an electrically peelable pressure sensitive adhesive composition containing a combination of a (poly)alkylene polyol having a particular number average molecular weight and an ammonium salt together with an acrylic polymer can solve the above problems, and completed the present invention.

Specifically, the present invention provides the following [1] to [14].
[1] An electrically peelable pressure sensitive adhesive composition comprising an acrylic polymer (A), a (poly)alkylene polyol (B) having a number average molecular weight of 2000 or less, and an ammonium salt (C).
[2] The electrically peelable pressure sensitive adhesive composition according to the above [1], wherein the component (C) is an ammonium sulfonate.
[3] The electrically peelable pressure sensitive adhesive composition according to the above [2], wherein the ammonium sulfonate is a compound represented by the following general formula (c-1);

[Chem. 1]

$$R^1O\text{-}(R^2O)_n\text{-}SO_3NH_4 \qquad (c\text{-}1)$$

wherein $R^1$ represents any of an alkyl group that may have a substituent, an alkenyl group that may have a substituent, and an aryl group that may have a substituent, and a polycyclic aromatic hydrocarbon group is also encompassed in the aryl group; $R^2$ represents an alkylene group having 1 to 10 carbon atoms that may have a substituent; and n represents a real number of 1 or more.
[4] The electrically peelable pressure sensitive adhesive composition according to any of the above [1] to [3], wherein the content of the component (C) based on 100 parts by mass of the component (A) is 3 to 250 parts by mass.
[5] The electrically peelable pressure sensitive adhesive composition according to any of the above [1] to [4], wherein the component (B) comprises a (poly)alkylene glycol.
[6] The electrically peelable pressure sensitive adhesive composition according to the above [5], wherein the (poly)alkylene glycol is a compound represented by the following general formula (b-1);

[Chem. 2]

$$HO\text{-}(EO)_p\text{-}(PO)_q\text{-}H \qquad (b\text{-}1)$$

wherein EO represents ethylene oxide, PO represents propylene oxide, and p and q are real numbers satisfying p≥0, q≥0, and p+q≥1; and when the compound represented by general formula (b-1) is a copolymer of EO and PO, the compound may be a compound formed by block copolymerization or a compound formed by random copolymerization.

[7] The electrically peelable pressure sensitive adhesive composition according to any of the above [1] to [6], wherein a content of the component (S) based on 100 parts by mass of the component (A) is 3 to 250 parts by mass.

[8] The electrically peelable pressure sensitive adhesive composition according to any of the above [1] to [7], wherein the component (A) is an acrylic copolymer comprising 60 to 99.9% by mass of a constituent unit (a1) derived from an alkyl (meth)acrylate, and 0.1 to 40% by mass of a constituent unit (a2) derived from a functional group-containing unsaturated monomer.

[9] The electrically peelable pressure sensitive adhesive composition according to any of the above [1] to [8], further comprising a cross-linking agent (D).

[10] An electrically peelable pressure sensitive adhesive sheet comprising a pressure sensitive adhesive layer formed of a material comprising the electrically peelable pressure sensitive adhesive composition according to any of the above [1] to [9].

[11] The electrically peelable pressure sensitive adhesive sheet according to the above [10], comprising the pressure sensitive adhesive layer on at least one face of an electrically conductive substrate.

[12] The electrically peelable pressure sensitive adhesive sheet according to the above [10], having a configuration in which the pressure sensitive adhesive layer is sandwiched between two release sheets.

[13] The electrically peelable pressure sensitive adhesive sheet according to the above [10], wherein when a voltage is applied between faces on both sides of the pressure sensitive adhesive layer sandwiched between two adherends or an adherend and a substrate, peeling occurs between a face of the pressure sensitive adhesive layer connected to a cathode side and the adherend or the substrate in contact with the face.

[14] A method for using an electrically peelable pressure sensitive adhesive sheet, comprising sticking the electrically peelable pressure sensitive adhesive sheet according to the above [10] to an adherend having electrical conductivity.

Advantageous Effects of Invention

In the electrically peelable pressure sensitive adhesive composition of the present invention, the adhesiveness before voltage application is high, but the adhesiveness can be effectively decreased by voltage application for a short time. Therefore, the electrically peelable pressure sensitive adhesive sheet of the present invention having a pressure sensitive adhesive layer comprising the pressure sensitive adhesive composition has good adhesion and has excellent peelability due to voltage application.

BRIEF DESCRIPTION OF DRAWINGS

FIG. 2 relates to the electrically peelable pressure sensitive adhesive sheet of the present invention and shows diagrams showing the difference between (a) the pressure sensitive adhesive sheet before voltage application and (b) the pressure sensitive adhesive sheet after voltage application.

FIG. 3 relates to the electrically peelable pressure sensitive adhesive sheet of the present invention and shows diagrams showing the difference between (a) the pressure sensitive adhesive sheet before voltage application and (b) the pressure sensitive adhesive sheet after voltage application.

DESCRIPTION OF EMBODIMENTS

Figure 1:
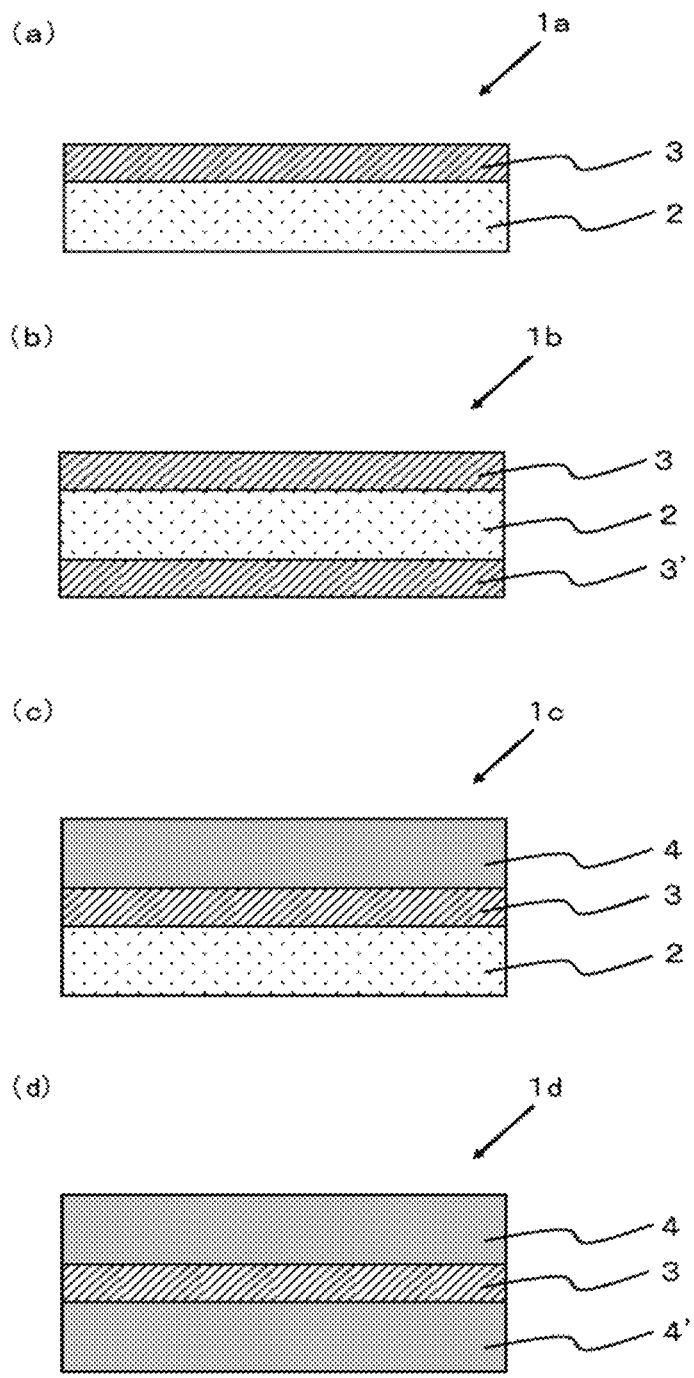
FIG. 1 shows cross-sectional views of the electrically peelable pressure sensitive adhesive sheets of the present invention showing examples of the configurations of the pressure sensitive adhesive sheets.

In the present invention, for example, "(meth)acrylic acid" is a term indicating both "acrylic acid" and "methacrylic acid," and a "(poly)alkylene polyol" is used as a term indicating both a "polyalkylene polyol" and an "alkylene polyol." The same applies to other similar terms.

In addition, in the present invention, the values of mass average molecular weight (Mw) and number average molecular weight (Mn) are values in terms of standard polystyrene measured by a gel permeation chromatography (GPC) method and are specifically values measured based on a method described in Examples.

[Electrically Peelable Pressure Sensitive Adhesive Composition]

The electrically peelable pressure sensitive adhesive composition (hereinafter also simply referred to as an "pressure sensitive adhesive composition") of the present invention contains an acrylic polymer (A), a (poly)alkylene polyol (B) having a number average molecular weight of no greater than 2000, and an ammonium salt (C). The pressure sensitive adhesive composition of the present invention contains a combination of a (poly)alkylene polyol (B) having a number average molecular weight of no greater than 2000, and an ammonium salt (C) together with an acrylic polymer (A). Therefore, the electrically peelable pressure sensitive adhesive composition of the present invention has a high adhesiveness before voltage application, but the adhesiveness can decrease effectively by voltage application for a short time.

<Component (A): Acrylic Polymer>

The acrylic polymer (A) contained in the pressure sensitive adhesive composition of the present invention comprises an alkyl (meth)acrylate (hereinafter also referred to as "the monomer (a1)") derived from an alkyl (meth)acrylate.

The component (A) may be a polymer comprising only the constituent unit (a1) but is preferably an acrylic copolymer comprising a constituent unit (a2) derived from a functional group-containing unsaturated monomer (hereinafter also referred to as the monomer (a2)) together with the constituent unit (a1).

In addition, the acrylic copolymer may be a copolymer comprising a constituent unit (a3) derived from another monomer (hereinafter also referred to as "the monomer (a3)") other than the monomers (a1) and (a2).

When the component (A) is a copolymer, the form of copolymerization is not particularly limited, and the copolymer may be any of a random copolymer, a block copolymer, and a graft copolymer.

In the present invention, the component (A) may be used singly, or two or more polymers (A1) may be used in combination.

The mass average molecular weight (Mw) of the acrylic polymer (A) is preferably 200000 to 1500000, more preferably 350000 to 1200000, further preferably 450000 to 1050000, and still further preferably 550000 to 900000 from the viewpoint of an improvement in the adhesiveness of the obtained pressure sensitive adhesive composition.

When the Mw of the component (A) is 200000 or more, the cohesion of the obtained pressure sensitive adhesive composition improves, and sufficient adhesiveness is obtained. On the other hand, when the Mw of the component (A) is 1500000 or less, a phenomenon in which the adhesion of the pressure sensitive adhesive layer of a formed pressure sensitive adhesive sheet decreases due to a too high elastic modulus of the pressure sensitive adhesive layer can be suppressed.

In addition, the component (A) is preferably an acrylic copolymer comprising a constituent unit (a1) derived from an alkyl (meth)acrylate and a constituent unit (a2) derived from a functional group-containing unsaturated monomer (hereinafter also referred to as "the monomer (a2)") from the viewpoint of an improvement in the adhesiveness of the obtained pressure sensitive adhesive composition before voltage application.

The monomers (a1) and (a2) that are raw materials of the acrylic copolymer will be described below.

(Monomer (a1) and Constituent Unit (a1))

Examples of the monomer (a1) include methyl (meth)acrylate, ethyl (meth)acrylate, propyl (meth)acrylate, isopropyl (meth)acrylate, butyl (meth) acrylate, pentyl (meth)acrylate, hexyl (meth)acrylate, heptyl (meth)acrylate, 2-ethylhexyl (meth)acrylate, octyl (meth)acrylate, nonyl (meth)acrylate, decyl (meth)acrylate, tridecyl (meth)acrylate, and an alkyl (meth)acrylate such as stearyl (meth)acrylate.

These monomers (a1) may be used singly, or two or more of these monomers (a1) may be used in combination.

Among these, from the viewpoint of an improvement in the adhesiveness of the obtained pressure sensitive adhesive composition, alkyl (meth)acrylates having an alkyl group having 4 to 12 carbon atoms are preferred, and alkyl (meth)acrylates having an alkyl group having 4 to 8 carbon atoms are more preferred.

As a preferred monomer (a1), one or more selected from butyl (meth) acrylate, pentyl (meth) acrylate, hexyl (meth) acrylate, heptyl (meth)acrylate, and 2-ethylhexyl (meth) acrylate are preferred, and one or more selected from butyl (meth)acrylate and 2-ethylhexyl (meth)acrylate are more preferred, and butyl (meth)acrylate is further preferred.

The content of the constituent unit (a1) derived from the monomer (a1) is preferably 60 to 99.9% by mass, more preferably 70 to 99% by mass, further preferably 80 to 97% by mass, and still further preferably 85 to 95% by mass based on all constituent units of the acrylic polymer (A) (100% by mass).

When the content of the constituent unit (a1) is 60% by mass or more, the adhesiveness of the obtained pressure sensitive adhesive composition before voltage application can be good. In addition, when the content is 99.9% by mass or less, the content of the constituent unit (a2) derived from the monomer (a2) described above can be ensured, and the cohesion can be improved, and the adhesiveness of the obtained pressure sensitive adhesive composition can be further improved.

The content of a constituent unit derived from an alkyl (meth)acrylate having an alkyl group having 4 to 12 carbon atoms is preferably 50 to 100% by mass, more preferably 65 to 100% by mass, further preferably 80 to 100% by mass, and still further preferably 95 to 100% by mass based on the total amount of the constituent unit (a1) (100% by mass) from the viewpoint of an improvement in the adhesiveness of the obtained pressure sensitive adhesive composition before voltage application.

(Monomer (a2) and Constituent Unit (a2))

The functional group-containing unsaturated monomer, the monomer (a2), is a compound having a functional group and one or more double bonds in the molecule. The functional group of the monomer (a2) is a cross-linking point of a cross-linking reaction, and the cohesion can be improved, and the electrical peelability of a pressure sensitive adhesive sheet using the obtained pressure sensitive adhesive composition can be improved.

Examples of the monomer (a2) include carboxy group-containing unsaturated monomers, hydroxyl group-containing unsaturated monomers, and epoxy group-containing unsaturated monomers.

Examples of the carboxy group-containing unsaturated monomers include ethylenic unsaturated monocarboxylic acids such as (meth)acrylic acid and crotonic acid; ethylenic unsaturated dicarboxylic acids such as fumaric acid, itaconic acid, maleic acid, and citraconic acid; and 2-carboxylethyl (meth)acrylate.

Examples of the hydroxyl group-containing unsaturated monomers include hydroxyalkyl (meth)acrylates such as 2-hydroxyethyl (meth)acrylate, 2-hydroxypropyl (meth)acrylate, 3-hydroxypropyl(meth)acrylate, 2-hydroxybutyl (meth) acrylate, 3-hydroxybutyl (meth) acrylate, 4-hydroxybutyl (meth) acrylate, and glycerin di(meth)acrylate.

Examples of the epoxy group-containing unsaturated monomers include glycidyl (meth)acrylate.

These monomers (a2) may be used singly, or two or more of these monomers (a2) may be combined.

Among these, from the viewpoint of versatility and the viewpoint of an improvement in the adhesion of a pressure sensitive adhesive sheet using the obtained pressure sensitive adhesive composition, carboxy group-containing unsaturated monomers are preferred, ethylenic unsaturated monocarboxylic acids are more preferred, (meth)acrylic acid is further preferred, and acrylic acid is still further preferred.

The content of the constituent unit (a2) derived from the monomer (a2) is preferably 0.1 to 40% by mass, more preferably 0.4 to 25% by mass, further preferably 0.7 to 18% by mass, and still further preferably 1.0 to 12% by mass based on all constituent units of the acrylic polymer (A) (100% by mass) from the viewpoint of improvements in the adhesion of a pressure sensitive adhesive sheet using the obtained pressure sensitive adhesive composition.

When the content of the constituent unit (a2) is 0.1% by mass or more, cross-linking bonds can be sufficiently formed with a cross-linking agent to improve the cohesion, and thus the adhesion of a pressure sensitive adhesive sheet using the obtained pressure sensitive adhesive composition can be further improved. On the other hand, when the content of the constituent unit (a2) is 40% by mass or less, the content of the constituent unit (a1) derived from the monomer (a1) can be ensured, and therefore, the adhesion of a pressure sensitive adhesive sheet using the obtained pressure sensitive adhesive composition can be good.

(Monomer (a3) and Constituent Unit (a3))

The acrylic polymer (A) may be a copolymer further having the constituent unit (a3) derived from another monomer (a3) other than the monomers (a1) and (a2).

Examples of the another monomer (a3) include olefins such as ethylene, propylene, and isobutylene, halogenated olefins such as vinyl chloride and vinylidene chloride, diene-based monomers such as butadiene, isoprene, and chloroprene, styrene, α-methylstyrene, vinyltoluene, vinyl formate, vinyl acetate, acrylonitrile, (meth)acrylamide, (meth)acrylonitrile, (meth)acryloylmorpholine, and N-vinylpyrrolidone.

The content of the constituent unit (a3) derived from the monomer (a3) is preferably 0 to 20% by mass, more preferably 0 to 10% by mass, further preferably 0 to 5% by mass, and still further preferably 0 to 2% by mass based on all constituent units of the acrylic polymer (A) (100% by mass).

The method for synthesizing the acrylic polymer (A) is not particularly limited, and the acrylic polymer (A) can be synthesized in the presence or absence of a solvent by a known polymerization method.

Examples of the solvent used include ethyl acetate and toluene.

In the polymerization reaction, a polymerization initiator may be used. Examples of the polymerization initiator include azobisisobutyronitrile and benzoyl peroxide.

In addition, the polymerization conditions are not particularly limited, but the polymerization is preferably performed under the conditions of a polymerization temperature of 50 to 90° C. and a reaction time of 2 to 30 hours.

The content of the acrylic polymer (A) is preferably 25 to 97% by mass based on the total amount (100% by mass) of the pressure sensitive adhesive composition from the viewpoint of an improvement in the adhesiveness of the obtained pressure sensitive adhesive composition; it is more preferably 35 to 94% by mass, further preferably 50 to 90% by mass, and still further preferably 70 to 85% by mass from the viewpoint of improving the adhesiveness of the obtained pressure sensitive adhesive composition before voltage application; and it is more preferably 25 to 70% by mass, further preferably 25 to 65% by mass, and still further preferably 25 to 50% by mass from the viewpoint of providing a pressure sensitive adhesive composition whose adhesiveness after voltage application can be effectively decreased.

<Component (B): (Poly)alkylene Polyol>

The pressure sensitive adhesive composition of the present invention contains the (poly)alkylene polyol (B) having a number average molecular weight of 2000 or less together with the component (C) described later from the viewpoint of providing a pressure sensitive adhesive composition whose adhesiveness after voltage application can be effectively decreased.

When the number average molecular weight of the component (B) is more than 2000, it is difficult to sufficiently decrease the adhesiveness of the obtained pressure sensitive adhesive composition after voltage application, and the electrical peelability of a pressure sensitive adhesive sheet using the pressure sensitive adhesive composition tends to be poor.

Therefore, the number average molecular weight of the component (B) is preferably 100 to 2000, more preferably 120 to 1600, more preferably 140 to 1300, further preferably 180 to 1000, further preferably 250 to 900, and still further preferably 320 to 760 from the viewpoint of obtaining a pressure sensitive adhesive composition whose adhesiveness after voltage application can decrease effectively.

Examples of the (poly)alkylene polyol that is the component (B) include polyalkylene glycols such as polyethylene glycol, polypropylene glycol, polybutylene glycol, and polyethylene polypropylene glycol; alkylene glycols or diols such as ethylene glycol, propylene glycol, 1,3-propanediol, 1,4-butylene glycol, 1,3-butylene glycol, 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, diethylene glycol, and triethylene glycol; and polyhydric alcohols such as triols such as glycerin and trimethylolpropane.

These (poly)alkylene polyols may be used singly, or two or more of these (poly)alkylene polyols may be used in combination.

Among these, as the component (B), from the viewpoint of obtaining a pressure sensitive adhesive composition whose adhesiveness after voltage application can be effectively decreased, a (poly)alkylene glycol is preferably contained, and one or more selected from polyethylene glycol, triethylene glycol, diethylene glycol, and ethylene glycol are more preferably contained.

The content of the (poly)alkylene glycol in the component (B) is preferably 50 to 100% by mass, more preferably 70 to 100% by mass, further preferably 85 to 100% by mass, and still further preferably 95 to 100% by mass based on the total amount (100% by mass) of the component (B) from the same viewpoint as the above.

As the (poly)alkylene glycol used in the present invention, from the viewpoint of obtaining a pressure sensitive adhesive composition whose adhesiveness after voltage application can be effectively decreased, a compound represented by the following general formula (b-1) is preferred, and polyethylene glycol is more preferred.

[Chem. 3]

(b-1)

In the above general formula (b-1), EO represents ethylene oxide, and PO represents propylene oxide. p and q are real numbers satisfying p≥0, q≥0, and p+q≥1. When the compound represented by general formula (b-1) is a copolymer of EO and PO, the compound may be a compound formed by block copolymerization or a compound formed by random copolymerization.

The values of p and q are preferably values adjusted so that the number average molecular weight of the compound represented by the above general formula (b-1) falls within the above-described range.

In the present invention, the component (B) may be used singly, or two or more component (B) s may be used in combination.

The content of the component (B) is preferably 3 to 250 parts by mass, more preferably 4 to 220 parts by mass, more preferably 6 to 190 parts by mass, more preferably 12 to 170 parts by mass, further preferably 20 to 150 parts by mass, further preferably 35 to 140 parts by mass, and still further preferably 50 to 130 parts by mass based on 100 parts by mass of the component (A) from the viewpoint of obtaining a pressure sensitive adhesive composition whose adhesiveness after voltage application can be effectively decreased, and the viewpoint of keeping the adhesiveness of the obtained pressure sensitive adhesive composition before voltage application well.

When the content of the component (B) is 3 parts by mass or more, a pressure sensitive adhesive composition whose adhesiveness after voltage application can be effectively decreased can be obtained. On the other hand, when the content of the component (B) is 250 parts by mass or less, a decrease in the adhesiveness of the obtained pressure sensitive adhesive composition before voltage application can be suppressed, and the adhesiveness can be kept well.

<Component (C): Ammonium Salt>

The pressure sensitive adhesive composition of the present invention contains the ammonium salt (C) together with the above-described component (B) from the viewpoint of providing a pressure sensitive adhesive composition whose adhesiveness after voltage application can be effectively decreased.

As the ammonium salt, any compound that produces an ammonium ion when ionized can be used, but from the viewpoint of providing a pressure sensitive adhesive composition whose adhesiveness after voltage application can be effectively decreased, the ammonium salt is preferably an ammonium sulfonate.

In the present invention, the ammonium salts refer to salts having a cation represented by $NH_4+$, and quaternary ammonium salts are not encompassed in the ammonium salts.

Further, as the ammonium sulfonate, a compound represented by the following general formula (c-1) is more preferred.

[Chem. 4]

$$R^1O\text{-}(R^2O)_n\text{-}SO_3NH_4 \quad \text{(c-1)}$$

In the above formula (c-1), $R^1$ represents any of an alkyl group that may have a substituent, an alkenyl group that may have a substituent, and an aryl group that may have a substituent, and a polycyclic aromatic hydrocarbon group is also encompassed in the aryl group.

$R^2$ represents an alkylene group having 1 to 10 carbon atoms that may have a substituent.

n represents a real number of 1 or more and is preferably 1 to 30, more preferably 1 to 20, further preferably 1 to 14, and still further preferably 2 to 12.

Examples of the substituent that the above alkyl group, alkenyl group, aryl group, or alkylene group may have include alkyl groups having 1 to 6 carbon atoms, halogen atoms, a hydroxyl group, acyl groups, a carboxyl group, ester groups, and a carbamoyl group.

Examples of the above alkyl group that can be selected as $R^1$ include a methyl group, an ethyl group, a n-propyl group, an isopropyl group, a n-butyl group, an isobutyl group, a t-butyl group, a pentyl group, and a hexyl group. Cycloalkyl groups such as a cyclopentyl group and a cyclohexyl group are also included.

The number of carbon atoms of the alkyl group is preferably 1 to 18, more preferably 1 to 12, and further preferably 1 to 6.

Examples of the above alkenyl group that can be selected as $R^1$ include a vinyl group, a propenyl group, a butenyl group, a pentenyl group, a pentadienyl group, a hexenyl group, a hexadienyl group, a heptenyl group, an octenyl group, an octadienyl group, a 2-ethylhexenyl group, and a decenyl group. Cycloalkenyl groups such as a cyclopropenyl group, a cyclopentenyl group, a cyclooctenyl group, and a cyclodecenyl group are also included.

Examples of the above aryl group that can be selected as $R^1$ include a phenyl group, a biphenylyl group, a terphenyl group, and a group represented by the following formula (c-2). Polycyclic aromatic hydrocarbon groups (condensed aryl groups) such as a naphthyl group and an anthryl group are also included.

The number of ring-forming carbon atoms of the aryl group is preferably 6 to 24, more preferably 6 to 18, and further preferably 6 to 12.

[Chem. 5]

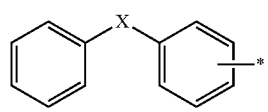

(c-2)

In the above formula (c-2), X represents an alkylene group having 1 to 10 carbon atoms, or an oxygen atom, and * represents a moiety bonded to an oxygen atom. In addition, the benzene rings in formula (c-2) may have a substituent. Examples of the substituent include alkyl groups having 1 to 6 carbon atoms, halogen atoms, a hydroxyl group, acyl groups, a carboxyl group, ester groups, and a carbamoyl group.

Examples of the alkylene group having 1 to 10 carbon atoms include the same as $R^2$.

Examples of the above alkylene group that can be selected as $R^2$ include a methylene group, an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, and a n-decylene group.

The number of carbon atoms of the alkylene group is preferably 1 to 10, more preferably 1 to 6, further preferably 1 to 4, and still further preferably 2 to 3.

As $R^1$ in formula (c-1), an aryl group that may have a substituent is preferred, and the group represented by formula (c-2) or a naphthyl group is more preferred.

In addition, as $R^2$ in formula (c-1), an ethylene group or a propylene group is preferred, and an ethylene group is more preferred.

The number average molecular weight (Mn) of the component (C) is preferably 100 to 3000, more preferably 150 to 2500, further preferably 200 to 2000, and still further preferably 300 to 1500.

In the present invention, the component (C) may be used singly, or two or more component (C)s may be used in combination.

The content of the component (C) is preferably 3 to 250 parts by mass, more preferably 4 to 220 parts by mass, more preferably 6 to 190 parts by mass, more preferably 12 to 170 parts by mass, further preferably 20 to 150 parts by mass, further preferably 35 to 140 parts by mass, and still further preferably 50 to 130 parts by mass based on 100 parts by mass of the component (A) from the viewpoint of obtaining a pressure sensitive adhesive composition whose adhesiveness after voltage application can be effectively decreased, and the viewpoint of keeping the adhesiveness of the obtained pressure sensitive adhesive composition before voltage application well.

When the content of the component (C) is 3 parts by mass or more, a pressure sensitive adhesive composition whose adhesiveness after voltage application can be effectively decreased can be obtained. On the other hand, when the content of the component (C) is 250 parts by mass or less, a decrease in the adhesiveness of the obtained pressure sensitive adhesive composition before voltage application can be suppressed, and the adhesiveness can be kept well.

The mass ratio of the component (B) to the component (C) in the pressure sensitive adhesive composition of the present invention [(B)/(C)] is preferably 5/95 to 95/5, more preferably 10/90 to 90/10, further preferably 15/85 to 85/15, and still further preferably 20/80 to 80/20 from the viewpoint of providing a pressure sensitive adhesive composition whose adhesiveness after voltage application can be effectively decreased, and the viewpoint of keeping the adhesiveness of the obtained pressure sensitive adhesive composition before voltage application well.

<Component (D): Cross-Linking Agent>

The pressure sensitive adhesive composition of the present invention preferably further contains a cross-linking agent (D) from the viewpoint of increasing cohesion to exhibit the desired adhesiveness.

When the component (A) comprises the constituent unit (a2) derived from the monomer (a2) and has the above-described functional group, the cross-linking agent (D) is a compound that is cross-linked to the functional group.

Examples of the cross-linking agent (D) include isocyanate-based cross-linking agents, epoxy-based cross-linking agents, oxazoline-based cross-linking agents, carbodiimide-based cross-linking agents, aziridine-based cross-linking agents, polyisocyanate-based cross-linking agents, melamine-based cross-linking agents, metal complex-based cross-linking agents, amine-based cross-linking agents, and hydrazine derivatives such as adipic acid dihydrazide and sebacic acid dihydrazide.

These cross-linking agents may be used singly, or two or more of these cross-linking agents may be used in combination.

Among these, from the viewpoint that the obtained pressure sensitive adhesive composition exhibits high adhesiveness, isocyanate-based cross-linking agents are preferred.

In addition, epoxy-based cross-linking agents are preferred, from the viewpoint of being efficiently cross-linked to the acrylic polymer as the component (A) without reacting with the polyoxyalkylene polyether as the component (B), and thus allowing the hydroxyl group of the component (B) to remain in the system to provide a pressure sensitive adhesive composition whose adhesiveness after voltage application can be effectively decreased.

The content of (D) is preferably 0.01 to 10 parts by mass, more preferably 0.05 to 6 parts by mass, and further preferably 0.07 to 4 parts by mass based on 100 parts by mass of the acrylic polymer (A) from the viewpoint that the obtained pressure sensitive adhesive composition exhibits high adhesiveness.

<Tackifying Resin>

The pressure sensitive adhesive composition of the present invention may further contains a tackifying resin in addition to the above Component (A) to (D) from the viewpoint of further improving the adhesiveness of the obtained pressure sensitive adhesive composition before voltage application.

Examples of the tackifying resin include rosin-based resins such as rosin resins, rosin phenol resins, and rosin ester resins; hydrogenated rosin-based resins obtained by hydrogenating these rosin-based resins; terpene-based resins such as terpene-based resins, terpene phenol-based resins, and aromatic modified terpene-based resins; hydrogenated terpene-based resins obtained by hydrogenating these terpene-based resins; C5-based petroleum resins obtained by copolymerizing C5 fractions such as pentene, isoprene, piperine, and 1,3-pentadiene produced by the thermal cracking of petroleum naphtha, and hydrogenated petroleum resins of these C5-based petroleum resins; and C9-based petroleum resins obtained by copolymerizing C9 fractions such as indene, vinyltoluene, α-methylstyrene, and β-methylstyrene produced by the thermal cracking of petroleum naphtha, and hydrogenated petroleum resins of these C9-based petroleum resins.

The softening point of the tackifying resin is preferably 60 to 170° C., more preferably 75 to 150° C., further preferably 85 to 140° C., and still further preferably 90 to 130° C. from the viewpoint of further improving the adhesiveness of the obtained pressure sensitive adhesive composition before voltage application. The value of the softening point of the tackifying resin is a value measured according to JIS K 2531.

<General-Purpose Additives>

The pressure sensitive adhesive composition of the present invention may contain general-purpose additives other than the above in a range that does not impair the effects of the present invention.

Examples of the general-purpose additives include antioxidants, ultraviolet absorbing agents, light stabilizers, resin stabilizers, softeners (plasticizers), fillers, rust preventives, pigments, and dyes.

When the general-purpose additives are added, the content of each general-purpose additive is preferably 0.01 to 10 parts by mass, more preferably 0.05 to 5 parts by mass, and further preferably 0.1 to 3 parts by mass based on 100 parts by mass of the acrylic polymer (A).

[Electrically Peelable Pressure Sensitive Adhesive Sheet]

The electrically peelable pressure sensitive adhesive sheet (hereinafter also simply referred to as an "pressure sensitive adhesive sheet") of the present invention has a pressure sensitive adhesive layer comprising the electrically peelable pressure sensitive adhesive composition of the present invention described above.

The configuration of the pressure sensitive adhesive sheet of the present invention is not particularly limited as long as it has a pressure sensitive adhesive layer comprising the pressure sensitive adhesive composition of the present invention. The pressure sensitive adhesive sheet of the present invention may be a pressure sensitive adhesive sheet having a pressure sensitive adhesive layer on at least one face of a substrate, or a pressure sensitive adhesive sheet having a configuration in which a pressure sensitive adhesive layer is sandwiched between two release sheets.

FIG. 1 shows cross-sectional views of electrically peelable pressure sensitive adhesive sheets, which show the configurations of the electrically peelable pressure sensitive adhesive sheet of the present invention.

Examples of specific configurations of the pressure sensitive adhesive sheet of the present invention include a substrate-attached electrically peelable pressure sensitive adhesive sheet 1a having a pressure sensitive adhesive layer 3 on one face of a substrate 2 as shown in FIG. 1 (a).

In addition, examples of specific configurations of the pressure sensitive adhesive sheet of the present invention also include a substrate-attached electrically peelable pressure sensitive adhesive sheet 1b having a pressure sensitive adhesive layer 3 and a pressure sensitive adhesive layer 3' on both faces of a substrate 2 as shown in FIG. 1 (b), and a substrate-attached electrically peelable pressure sensitive adhesive sheet 1c in which a release sheet 4 is further laminated on a pressure sensitive adhesive layer 3 formed on one face of a substrate 2 as shown in FIG. 1 (c). In the electrically peelable pressure sensitive adhesive sheet 1b, release sheets may be further provided on the pressure sensitive adhesive layers 3 and 3'.

In addition, the configuration of the pressure sensitive adhesive sheet of the present invention may be a substrate-free electrically peelable pressure sensitive adhesive sheet 1d having a configuration in which a pressure sensitive adhesive layer 3 is sandwiched between two release sheets 4 and 4' without using a substrate as shown in FIG. 1 (d).

The materials of the release sheets 4 and 4' of this electrically peelable pressure sensitive adhesive sheet 1d may be the same or different but are preferably materials adjusted so that the peel strength of the release sheet 4 and the peel strength of the release sheet 4' are different.

Examples of other configurations of the pressure sensitive adhesive sheet of the present invention also include an electrically peelable pressure sensitive adhesive sheet having a configuration in which a pressure sensitive adhesive layer provided on one face of a release sheet whose surface is release-treated is rolled in a roll shape.

In addition, in the pressure sensitive adhesive sheet of the present invention, when a voltage is applied between the faces on both sides of the pressure sensitive adhesive layer sandwiched between two adherends or an adherend and a substrate, peeling occurs between the face of the pressure sensitive adhesive layer connected to the negative electrode side and the adherend or the substrate in contact with the face.

In other words, a case where an attempt is made to peel the electrically peelable pressure sensitive adhesive sheet 1a of the present invention from an adherend 11 as shown in (a) of FIG. 2 is considered. In this FIG. 2 (a), a pressure sensitive adhesive layer 3 is sandwiched between the adherend 11 and a substrate 2a, and an voltage can be applied from both faces of the pressure sensitive adhesive layer 3 by connecting the positive electrode terminal 51 of a voltage application apparatus 50 to the substrate 2a and connecting a negative electrode terminal 52 to the adherend 11.

When the substrate-free electrically peelable pressure sensitive adhesive sheet 1d as shown in (d) of FIG. 1 is used, the configuration of the "substrate 2a" in FIG. 2 is another "adherend," and a configuration in which the pressure sensitive adhesive layer 3 is sandwiched between two adherends is provided, and an voltage can be applied from both faces of the pressure sensitive adhesive layer 3 by connecting the positive electrode terminal 51 and the negative electrode terminal 52 of the voltage application apparatus 50 to the respective adherends.

When a voltage is applied in the state shown in this (a) of FIG. 2, the adhesion decreases between the face 3a of the pressure sensitive adhesive layer connected to the negative electrode side and the adherend 11 in contact with the face 3a of the pressure sensitive adhesive layer connected to the negative electrode side, and the electrically peelable pressure sensitive adhesive sheet 1a can be easily peeled from the adherend, as shown in (b) of FIG. 2.

In addition, on the contrary, when the negative electrode terminal and the positive electrode terminal are connected reversely to those of FIG. 2 as shown in (a) of FIG. 3, the adhesion decreases between the face 3a' of the pressure sensitive adhesive layer connected to the negative electrode side and the substrate 2a in contact with the face 3a' of the pressure sensitive adhesive layer connected to the negative electrode side, and the substrate 2a is peeled from the pressure sensitive adhesive layer 3.

The voltage applied (applied voltage) is preferably 10 to 200 V, more preferably 40 to 140 V, and further preferably 70 to 120 V, and the time of applying a voltage in the range (application time) is preferably 1 to 180 seconds, more preferably 5 to 120 seconds, and further preferably 10 to 90 seconds.

Generally, the larger the applied voltage is, the shorter the application time is, and on the other hand, the smaller the applied voltage is, the longer the application time is. For example, when the applied voltage is 10 to 50 V, peeling is possible with an application time of 30 to 300 seconds.

The adhesion of the pressure sensitive adhesive sheet of the present invention before voltage application is preferably 2.0 N/25 mm or more, more preferably 3.0 N/25 mm or more, and further preferably 4.0 N/25 mm or more.

In addition, the decrease rate of the adhesion of the pressure sensitive adhesive sheet of the present invention after voltage application is preferably 20% or more, more preferably 30% or more, further preferably 45% or more, and still further preferably 70% or more.

The adhesion of the pressure sensitive adhesive sheet of the present invention before voltage application and the decrease rate of the adhesion of the pressure sensitive adhesive sheet of the present invention after voltage application mean values measured by methods described in Examples.

The thickness of the pressure sensitive adhesive layer of the pressure sensitive adhesive sheet of the present invention is appropriately adjusted according to the application and the like and is preferably 0.5 to 120 μm, more preferably 1 to 100 μm, and further preferably 3 to 60 μm.

When the thickness of the pressure sensitive adhesive layer is 0.5 μm or more, good adhesion can be exhibited regardless of the type of the adherend. On the other hand, when the thickness of the pressure sensitive adhesive layer is 120 μm or less, an electrically peelable pressure sensitive adhesive sheet that has an advantage in terms of productivity and is also good in terms of handling properties can be provided.

The substrate of the pressure sensitive adhesive sheet of the present invention is preferably an electrically conductive substrate because when it is desired to peel the pressure sensitive adhesive sheet from an adherend, a voltage is applied to the pressure sensitive adhesive layer of the pressure sensitive adhesive sheet.

Examples of the material constituting the electrically conductive substrate include metals such as aluminum, tin-doped indium oxide, copper, iron, silver, platinum, and gold and alloys of these metals.

In addition, a metal-deposited body obtained by depositing the above metal on a film of a resin such as polyethylene terephthalate may be used as the substrate. When a metal is deposited on a resin film, the metal is preferably deposited on the face of the resin film in contact with the pressure sensitive adhesive layer.

The thickness of the substrate is preferably 5 to 300 μm, more preferably 10 to 150 μm, and further preferably 20 to 100 μm.

The release sheet used in the pressure sensitive adhesive sheet of the present invention can be obtained by coating one face or both faces of a release sheet substrate with a release agent.

Examples of the release sheet substrate include films of resins such as polyesters such as polyethylene terephthalate, polybutylene terephthalate, and polyethylene naphthalate, polyethylene, polypropylene, polybutene, polybutadiene, polymethylpentene, polyvinyl chloride, vinyl chloride copolymers, polyurethanes, ethylene-vinyl acetate copolymers, ionomer resins, ethylene (meth)acrylic acid copolymers, polystyrene, polycarbonates, fluororesins, low density polyethylene, linear low density polyethylene, and triacetyl cellulose, substrates of paper such as wood-free paper, coated paper, and glassine paper, and laminated paper obtained by laminating thermoplastic resins such as polyethylene on these paper substrates.

Examples of the release agent used include rubber-based elastomers such as silicone-based resins, olefin-based resins, long chain alkyl-based resins, alkyd-based resins, fluorine-based resins, isoprene-based resins, and butadiene-based resins.

The thickness of the release sheet is not particularly limited but is preferably 5 to 300 μm, more preferably 10 to 200 μm. When a polyethylene terephthalate-based film is used as the release sheet substrate, the thickness of the release sheet is preferably 10 to 100 μm.

[Method for Manufacturing Electrically Peelable Pressure Sensitive Adhesive Sheet]

The method for manufacturing the electrically peelable pressure sensitive adhesive sheet of the present invention is not particularly limited. Examples of the method include a method which involves blending an organic solvent such as toluene, ethyl acetate, or methyl ethyl ketone with the pressure sensitive adhesive composition of the present invention to prepare a solution of the pressure sensitive adhesive composition, coating a substrate or the release-treated face of a release sheet with the solution by a known coating method, and drying the solution to form a pressure sensitive adhesive layer to obtain a pressure sensitive adhesive sheet.

The (solid) concentration of active ingredient of the solution of the pressure sensitive adhesive composition is preferably 10 to 80% by mass, more preferably 25 to 70% by mass, and further preferably 45 to 65% by mass.

Examples of the method for coating the substrate or the release sheet with the solution of the pressure sensitive adhesive composition include a spin coating method, a spray coating method, a bar coating method, a knife coating method, a roll coating method, a blade coating method, a die coating method, and a gravure coating method.

In addition, after a substrate or the release layer face of a release sheet is coated with a solution obtained by dissolving the pressure sensitive adhesive composition in an organic solvent, in order to prevent the solvent and the low boiling point components from remaining in the formed pressure sensitive adhesive layer, drying treatment is preferably performed to remove these residues.

Examples of specific manufacturing methods classified by the configuration of the electrically peelable pressure sensitive adhesive sheet include the following methods.

First, the electrically peelable pressure sensitive adhesive sheet 1a having the pressure sensitive adhesive layer 3 on one face of the substrate 2 as shown in FIG. 1 (a) can be fabricated, for example, by directly coating one face of the substrate 2 with the solution of the pressure sensitive adhesive composition to form the pressure sensitive adhesive layer 3.

In addition, the electrically peelable pressure sensitive adhesive sheet 1a may be fabricated by directly coating the release-treated face of a release sheet with the solution of the pressure sensitive adhesive composition to form the pressure sensitive adhesive layer 3, then bonding the pressure sensitive adhesive layer 3 and the substrate 2 together, and removing the release sheet.

The electrically peelable pressure sensitive adhesive sheet 1b having the pressure sensitive adhesive layers 3 and 3' on both faces of the substrate 2 as shown in FIG. 1 (b) can be fabricated, for example, by directly coating both faces of the substrate 2 with the solution of the pressure sensitive adhesive composition to form the pressure sensitive adhesive layers 3 and 3'.

In addition, the electrically peelable pressure sensitive adhesive sheet 1b may be fabricated by providing two pressure sensitive adhesive layers each formed by directly coating the release-treated face of a release sheet with the solution of the pressure sensitive adhesive composition, bonding the respective pressure sensitive adhesive layers to both faces of the substrate 2, and removing the release sheets.

The electrically peelable pressure sensitive adhesive sheet 1c having the pressure sensitive adhesive layer 3 and the release sheet 4 in this order on the substrate 2 as shown in FIG. 1 (c) can be fabricated, for example, by laminating the release sheet 4 on the face of the pressure sensitive adhesive layer 3 of the electrically peelable pressure sensitive adhesive sheet 1a obtained as described above.

In addition, the electrically peelable pressure sensitive adhesive sheet 1c may be fabricated by directly coating the release-treated face of the release sheet 4 with the solution of the pressure sensitive adhesive composition to form the pressure sensitive adhesive layer 3, and then bonding the pressure sensitive adhesive layer 3 and the substrate 2 together.

The electrically peelable pressure sensitive adhesive sheet 1d having a configuration in which the pressure sensitive adhesive layer 3 is sandwiched between two release sheets 4 and 4' without using a substrate as shown in FIG. 1 (d) can be fabricated, for example, by directly coating the release-treated face of the release sheet 4 with the solution of the pressure sensitive adhesive composition to form the pressure sensitive adhesive layer 3, and then laminating another release sheet 4' on the face of this pressure sensitive adhesive layer 3.

As described above, the release sheet 4 and the release sheet 4' are preferably adjusted so that the peel strength is different.

[Method for Using Electrically Peelable Pressure Sensitive Adhesive Sheet]

The electrically peelable pressure sensitive adhesive sheet of the present invention can be used by sticking it to any adherend.

The adherend is not particularly limited and may or may not have electrical conductivity but is preferably an adherend having electrical conductivity so that the adherend is an electrode as it is, from the viewpoint that the application of a voltage to the pressure sensitive adhesive faces is easy.

Therefore, from the above viewpoint, the method for using the electrically peelable pressure sensitive adhesive sheet of the present invention is preferably a method of using the pressure sensitive adhesive sheet of the present invention by sticking it to an adherend having electrical conductivity.

Examples of the adherend having electrical conductivity include adherends comprising metals such as aluminum, tin-doped indium oxide, copper, iron, silver, platinum, and gold, alloys of these metals, or the like.

EXAMPLES

The present invention will be specifically described below by the following Examples, but the present invention is not limited to the following Examples.

In addition, for the mass average molecular weight (Mw) and the number average molecular weight (Mn) of components used in the following Examples, and Comparative Examples, values measured based on the following methods were used.

<Mass Average Molecular Weight (Mw) and Number Average Molecular Weight (Mn)>

Measurement was performed under the following conditions using a gel permeation chromatograph apparatus (manufactured by Tosoh Corporation, product name "HLC-8020"), and the values measured in terms of standard polystyrene were used.

(Mass Average Molecular Weight (Mw) Measurement Conditions)

Columns: "TSK guard column HXL-H," "TSK gel GMHXL (×2)," and "TSK gel G2000HXL" (all manufactured by Tosoh Corporation)

Column temperature: 40° C.

Developing solvent: tetrahydrofuran

Flow velocity: 1.0 mL/min (Number Average Molecular Weight (Mn) Measurement Conditions)

Columns: "TSK guard column HXL-L," "TSK gel G2500HXL," "TSK gel G2000HXL," and "TSK gel G1000HXL" (all manufactured by Tosoh Corporation)

Column temperature: 40° C.

Developing solvent: tetrahydrofuran

Flow velocity: 1.0 mL/min

Examples 1 to 15 and Comparative Examples 1 to 10

The components shown below were blended in amounts blended (active ingredient ratio (solid ratio)) described in Table 1, and toluene was further added as an organic solvent to prepare a coating liquid of an electrically peelable pressure sensitive adhesive composition having active ingredient (solid) concentration of 26% by mass. (Active ingredient means ingredients other than water and organic solvents remaining in a pressure sensitive adhesive composition.)

Next, the release-treated face of a release sheet (manufactured by LINTEC Corporation, product name "SP-PET381130," thickness: 38 μm, a polyethylene terephthalate film whose surface was silicone release-treated) was coated with this prepared coating liquid of the electrically peelable pressure sensitive adhesive composition so that the thickness after drying was 50 μm, and the coating liquid was dried at 100° C. for 120 seconds to form a pressure sensitive adhesive layer on the release sheet.

Then, an aluminum foil substrate (manufactured by NIPPON METAL FOIL CO., LTD., product name "Arumitantai S Tsuya 50 Fukuoka," thickness: 50 μm) as a substrate was stuck on the face of the formed pressure sensitive adhesive layer to fabricate an electrically peelable pressure sensitive adhesive sheet of a substrate-attached type having the same configuration as the electrically peelable pressure sensitive adhesive sheet 1c shown in (c) of FIG. 1.

The details of the components used in the Examples and the Comparative Examples are as follows.

<Component (A): Acrylic Polymer>

An ethyl acetate solution of an acrylic copolymer synthesized from 90 parts by mass of n-butyl acrylate (BA) and 10 parts by mass of acrylic acid (AA) (BA/AA=90/10 (% by mass), Mw=700000, solid concentration=33.6% by mass).

<Component (B): (Poly)alkylene Polyol>

Polyethylene glycol (Mn=400).

<Component (C): Ammonium Salt>

(C1): An ammonium salt of polyoxyethylene β-naphthylether sulfate represented by the following formula (C1) (Mn=500, m in formula (C1) represents the number of repeating units of the ethylene oxide chain).

[Chem. 6]

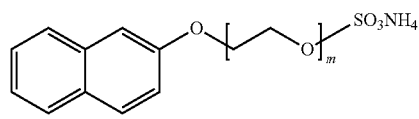

(C1)

(C2): An ammonium salt of polyoxyethylene diphenyl ether sulfate represented by the following formula (C2) (Mn=800, n in formula (C2) represents the number of repeating units of the ethylene oxide chain).

[Chem. 7]

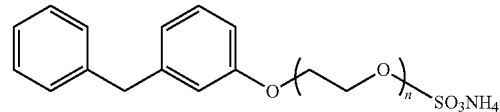

(C2)

<Component (D): Cross-Linking Agent>

"TETRAD-C": trade name, manufactured by Mitsubishi Gas Chemical Company, Inc., an epoxy-based cross-linking agent.

Using the substrate-attached electrically peelable pressure sensitive adhesive sheets fabricated in the Examples and the Comparative Examples, the adhesion of the pressure sensitive adhesive sheet before and after voltage application was measured based on the following methods. The results are shown in Table 1.

(1) Adhesion of Pressure Sensitive Adhesive Sheet Before Voltage Application

Each of the substrate-attached electrically peelable pressure sensitive adhesive sheets fabricated in the Examples and the Comparative Examples was cut to a size of 25 mm×300 mm, and in an environment of 23° C. and 50% RH (relative humidity), the release sheet was peeled, and the appearing pressure sensitive adhesive layer was stuck to an aluminum plate (manufactured by Paltec Test Panels Co., Ltd., product name "A105OP," 150 mm×70 mm×1 mm), an adherend. In the sticking, a roller having a weight of 2 kg was reciprocated once to pressure-bond the pressure sensitive adhesive sheet to the adherend. The pressure sensitive adhesive sheet stuck to the adherend was allowed to stand in an environment of 23° C. and 50% RH (relative humidity) for 24 hours after the sticking to fabricate an adhesion measurement sample.

Then, the pressure sensitive adhesive sheet was peeled in an environment of 23° C. and 50% RH (relative humidity) under the conditions of a peel rate of 300 mm/min and a peel angle of 180° using a tensile tester (manufactured by ORIENTEC CO., LTD., product name "TENSILON"), and the value (unit: N/25 mm) measured at this time was taken as the adhesion of the pressure sensitive adhesive sheet before voltage application.

(2) Adhesion of Pressure Sensitive Adhesive Sheet after Voltage Application

For the above-described adhesion measurement sample, as shown in (a) of FIG. 2, a voltage application apparatus 50 (manufactured by Takasago Ltd., product name "KH-100H") was used, a positive electrode terminal 51 was connected to a substrate of aluminum foil 2a, a negative electrode terminal 52 was connected to an adherend 11, and a voltage of 100 V was applied for 60 seconds.

After the voltage application, the adhesion measurement sample was allowed to stand for 30 seconds. Then, the pressure sensitive adhesive sheet was peeled in the same environment of 23° C. and 50% RH (relative humidity) under the conditions of a peel rate of 300 mm/min and a peel angle of 180° using a tensile tester (manufactured by ORIENTEC CO., LTD., trade name "TENSILON"), and the value (unit: N/25 mm) measured at this time was taken as the adhesion of the pressure sensitive adhesive sheet after voltage application.

The adhesion decrease rate in Table 1 is a value calculated by the following formula:

[the decrease rate of adhesion (%)]=100−[the adhesion of the pressure sensitive adhesive sheet after voltage application]/[the adhesion of the pressure sensitive adhesive sheet before voltage application]×100

INDUSTRIAL APPLICABILITY

The electrically peelable pressure sensitive adhesive sheet of the present invention has good adhesion and has excellent peelability due to voltage application. Therefore, the electrically peelable pressure sensitive adhesive sheet of the

TABLE 1

| | component(A) Acrylic copolymer (BA/AA = 90/10) (parts by mass)*1 | component(B) Polyethylene glycol (Mn = 400) (parts by mass)*1 | component(C) Ammonium salt (parts by mass)*1 C-1 | component(C) Ammonium salt (parts by mass)*1 C-2 | Component(D) Cross-linking agent (TETRAD-C) (parts by mass)*1 | Adhesion of pressure sensitive adhesive sheet before voltage application (N/25 mm) | Adhesion of pressure sensitive adhesive sheet after voltage application (N/25 mm) | Decrease rate of adhesion (%) |
|---|---|---|---|---|---|---|---|---|
| Example 1 | 100 | 8.9 | 8.9 | — | — | 8.8 | 7.0 | 20 |
| Example 2 | 100 | 8.9 | — | 8.9 | — | 9.5 | 6.4 | 33 |
| Example 3 | 100 | 14.9 | — | 59.5 | 0.09 | 5.7 | 3.1 | 46 |
| Example 4 | 100 | 14.9 | — | 119.0 | 0.09 | 6.6 | 1.4 | 79 |
| Example 5 | 100 | 29.8 | — | 29.8 | 0.09 | 5.6 | 3.4 | 39 |
| Example 6 | 100 | 29.8 | — | 59.5 | 0.09 | 5.8 | 2.4 | 59 |
| Example 7 | 100 | 29.8 | — | 119.0 | 0.09 | 6.4 | 1.0 | 84 |
| Example 8 | 100 | 59.5 | — | 14.9 | 0.09 | 5.1 | 3.1 | 39 |
| Example 9 | 100 | 59.5 | — | 29.8 | 0.09 | 5.6 | 2.8 | 50 |
| Example 10 | 100 | 59.5 | — | 59.5 | 0.09 | 5.1 | 1.3 | 75 |
| Example 11 | 100 | 59.5 | — | 119.0 | 0.09 | 6.4 | 1.1 | 83 |
| Example 12 | 100 | 119.0 | — | 14.9 | 0.09 | 4.2 | 1.8 | 57 |
| Example 13 | 100 | 119.0 | — | 29.8 | 0.09 | 4.9 | 2.2 | 55 |
| Example 14 | 100 | 119.0 | — | 59.5 | 0.09 | 4.8 | 0.3 | 94 |
| Example 15 | 100 | 119.0 | — | 119.0 | 0.09 | 5.5 | 0.3 | 95 |
| Comparative Example 1 | 100 | — | — | — | — | 6.4 | 6.5 | −2 |
| Comparative Example 2 | 100 | 8.9 | — | — | — | 8.4 | 7.5 | 10 |
| Comparative Example 3 | 100 | — | — | 8.9 | — | 7.9 | 7.5 | 5 |
| Comparative Example 4 | 100 | — | — | — | 0.09 | 4.7 | 4.8 | −2 |
| Comparative Example 5 | 100 | 14.9 | — | — | 0.09 | 4.7 | 4.9 | −4 |
| Comparative Example 6 | 100 | 29.8 | — | — | 0.09 | 4.6 | 4.9 | −7 |
| Comparative Example 7 | 100 | 59.5 | — | — | 0.09 | 4.8 | 5.0 | −4 |
| Comparative Example 8 | 100 | 119.0 | — | — | 0.09 | 3.8 | 4.0 | −5 |
| Comparative Example 9 | 100 | — | — | 14.9 | 0.09 | 5.0 | 5.3 | −6 |
| Comparative Example 10 | 100 | — | — | 29.8 | 0.09 | 5.3 | 5.5 | −4 |

*1 active ingredient ratio (solid ratio)

According to Table 1, it is seen that the electrically peelable pressure sensitive adhesive sheets of Examples 1 to 15 have low adhesion after voltage application and a high decrease rate of adhesion due to voltage application. In addition, it was confirmed that for the electrically peelable pressure sensitive adhesive sheets of Examples 1 to 15, as shown in (b) of FIG. 2, after voltage application, the pressure sensitive adhesive layer was peeled from the negative electrode side.

On the other hand, the result was that for the electrically peelable pressure sensitive adhesive sheets of Comparative Examples 1 to 10, compared with the Examples, the adhesion after voltage application was high, and a decrease in adhesion before and after voltage application was not much seen.

present invention is preferred, for example, for applications such as surface protection films, masking tapes for coating or for decoration, and peelable notes.

REFERENCE SIGNS LIST 1a, 1b, 1c, 1d electrically peelable pressure sensitive adhesive sheet
2 substrate
2a aluminum foil substrate
3, 3' pressure sensitive adhesive layer
3a, 3a' face of pressure sensitive adhesive layer connected to negative electrode side
4, 4' release sheet
11 adherend
50 voltage application apparatus

The invention claimed is:

1. An electrically peelable pressure sensitive adhesive composition, comprising:
   an acrylic polymer (A);
   a (poly)alkylene polyol (B) having a number average molecular weight of 2000 or less; and
   an ammonium salt (C),
   wherein the component (C) is an ammonium sulfonate,
   wherein the content of the component (B) is from 50 to 140 parts by mass, based on 100 parts by mass of the component (A), and
   wherein the content of the component (C) is from 6 to 250 parts by mass, based on 100 parts by mass of the component (A).

2. The electrically peelable pressure sensitive adhesive composition according to claim 1, wherein the ammonium sulfonate is a compound of formula (c-1):

$$R^1O\text{-}(R^2O)_n\text{-}SO_3NH_4 \quad (c\text{-}1)$$

wherein:
   $R^1$ represents any of an alkyl group that may have a substituent, an alkenyl group that may have a substituent, and an aryl group that may have a substituent, and a polycyclic aromatic hydrocarbon group is also included in the aryl group;
   $R^2$ represents an alkylene group having 1 to 10 carbon atoms that may have a substituent; and
   n represents a real number of 1 or more.

3. The electrically peelable pressure sensitive adhesive composition according to claim 1, wherein the component (B) comprises a (poly)alkylene glycol.

4. The electrically peelable pressure sensitive adhesive composition according to claim 3, wherein the (poly)alkylene glycol is a compound of formula (b-1):

$$HO\text{-}(EO)_p\text{-}(PO)_q\text{-}H \quad (b\text{-}1)$$

wherein:
   EO represents ethylene oxide;
   PO represents propylene oxide;
   p and q are real numbers satisfying $p \geq 0$, $q \geq 0$, and $p+q \geq 1$; and
   when the compound represented by formula (b-1) is a copolymer of EO and PO, the compound is formed by block copolymerization or by random copolymerization.

5. The electrically peelable pressure sensitive adhesive composition according to claim 1, wherein the component (A) is an acrylic copolymer comprising:
   60 to 99.9% by mass of a constituent unit (a1) derived from an alkyl (meth)acrylate; and
   0.1 to 40% by mass of a constituent unit (a2) derived from a functional group-containing unsaturated monomer.

6. The electrically peelable pressure sensitive adhesive composition according to claim 1, further comprising:
   a cross-linking agent (D).

7. The electrically peelable pressure sensitive adhesive composition according to claim 1, wherein the content of the component (C) is from 6 to 190 parts by mass, based on 100 parts by mass of the component (A).

8. The electrically peelable pressure sensitive adhesive composition according to claim 1, wherein the number average molecular weight of the (poly)alkylene polyol (B) is 140 to 1300.

9. The electrically peelable pressure sensitive adhesive composition according to claim 1, wherein the content of the component (B) is 50 to 130 parts by mass, based on 100 parts by mass of the component (A).

10. The electrically peelable pressure sensitive adhesive composition according to claim 1, wherein the electrically peelable pressure sensitive adhesive composition is electrically peelable at an applied voltage of 10 to 200 V.

11. An electrically peelable pressure sensitive adhesive sheet, comprising:
    a pressure sensitive adhesive layer formed of a material comprising the electrically peelable pressure sensitive adhesive composition according to claim 1.

12. The electrically peelable pressure sensitive adhesive sheet according to claim 11, comprising the pressure sensitive adhesive layer on at least one face of an electrically conductive substrate.

13. The electrically peelable pressure sensitive adhesive sheet according to claim 11, having a configuration in which the pressure sensitive adhesive layer is sandwiched between two release sheets.

14. The electrically peelable pressure sensitive adhesive sheet according to claim 11, wherein when a voltage is applied between faces on both sides of the pressure sensitive adhesive layer sandwiched between two adherends or an adherend and a substrate, peeling occurs between a face of the pressure sensitive adhesive layer connected to a cathode side and the adherend or the substrate in contact with the face.

15. A method, comprising:
    sticking the electrically peelable pressure sensitive adhesive sheet according to claim 11 to an adherend having electrical conductivity.

* * * * *